S. C. HAMLIN.
Chain-Pump Buckets.

No. 157,173.  Patented Nov. 24, 1874.

WITNESSES:  INVENTOR.

UNITED STATES PATENT OFFICE.

SOLOMON C. HAMLIN, OF YPSILANTI, MICHIGAN.

IMPROVEMENT IN CHAIN-PUMP BUCKETS.

Specification forming part of Letters Patent No. 157,173, dated November 24, 1874; application filed September 1, 1874.

*To all whom it may concern:*

Be it known that I, S. C. HAMLIN, of Ypsilanti, in the county of Washtenaw and State of Michigan, have invented certain new and useful Improvements in Chain-Pump Buckets; and I do hereby declare that the following is a full, clear, and exact description thereof, reference being had to the accompanying drawings, and to the letters of reference marked thereon, which form a part of this specification.

The nature of my invention consists in the construction and arrangement of a bucket for chain-pumps, as will be hereinafter more fully set forth.

In order to enable others skilled in the art to which my invention appertains to make and use the same, I will now proceed to describe its construction and operation, referring to the annexed drawing, in which—

Figure 1:
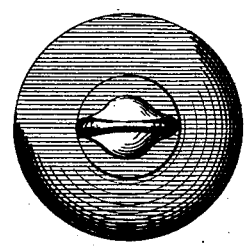
Figure 2:
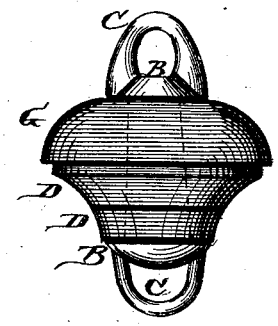
Figure 3:
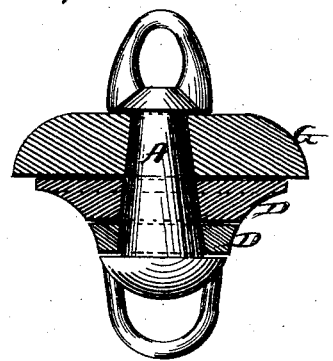

Figure 1 is a plan view, and Fig. 2 a side view, of my bucket. Fig. 3 is a longitudinal section of the same.

A represents a conical or tapering cylinder, of any suitable dimensions, provided at its lower end with a head, B, with ring or bail C. The cylinder A is larger at its lower end than at the upper, and on the same are first placed two rubber washers, D D, the sides of which are made concave, as shown in Figs. 2 and 3. Above these washers on the cylinder is placed a circular rubber disk, G, which forms the bucket proper. This disk is flat on its under side, and made convex on its upper and outer sides, so as to present a thin edge all around as a rubbing surface.

The washers D D support the disk G in position, and when the disk becomes worn one of the washers can be taken off and the disk expanded by pressing down the same on the cylinder. By this means the bucket may be used a great deal longer than if no such provision were made for its expansion.

Having thus fully described my invention, what I claim as new, and desire to secure by Letters Patent, is—

The combination, in a chain-pump bucket, of the conical or tapering cylinder A, washers D D, and disk G, constructed substantially as and for the purposes herein set forth.

In testimony that I claim the foregoing as my own I affix my signature in presence of two witnesses.

SOLOMON C. HAMLIN.

Witnesses:
CHARLES HOLMES, Jr.,
W. W. BRINCKERHOFF.